United States Patent
Chase et al.

(10) Patent No.: US 7,039,911 B2
(45) Date of Patent: May 2, 2006

(54) HYBRID THREADS FOR MULTIPLEXING VIRTUAL MACHINE

(75) Inventors: David R. Chase, Belmont, MA (US); F. Kenneth Zadeck, Ossining, NY (US)

(73) Assignee: Naturalbridge, Inc., Shreveport, LA (US)

( * ) Notice: Subject to any disclaimer, the term of this patent is extended or adjusted under 35 U.S.C. 154(b) by 600 days.

(21) Appl. No.: 10/150,603

(22) Filed: May 17, 2002

(65) Prior Publication Data

US 2003/0217087 A1   Nov. 20, 2003

(51) Int. Cl.
*G06F 9/455* (2006.01)
(52) U.S. Cl. .......................................... 718/1
(58) Field of Classification Search ................ 717/100, 717/114, 118, 140, 148; 718/1
See application file for complete search history.

(56) References Cited

U.S. PATENT DOCUMENTS

| | | | |
|---|---|---|---|
| 5,692,193 A | 11/1997 | Jagannathan et al. | |
| 5,758,184 A | 5/1998 | Lucovsky et al. | |
| 5,946,487 A | 8/1999 | Dangelo | |
| 6,081,665 A | 6/2000 | Nilsen et al. | |
| 6,110,226 A | 8/2000 | Bothner | |
| 6,253,215 B1 | 6/2001 | Agesen et al. | |
| 6,256,637 B1 | 7/2001 | Venkatesh et al. | |
| 6,282,702 B1 | 8/2001 | Ungar | |
| 6,356,996 B1 | 3/2002 | Adams | |
| 6,385,764 B1 * | 5/2002 | Blandy et al. ............. 717/127 |
| 6,529,962 B1 * | 3/2003 | Azagury et al. ........... 719/330 |

OTHER PUBLICATIONS

Java™ 2 Platform Enterprise Edition Specification, v1.3, available at Java.sun.com/j2ee/j2ee-1_3-pfd4-spec.pdf (Jul. 2001).*
Java™ Virtual Machine Specification, Second Edition, available at Java.sun.com/docs/books/vmspec/2nd-edition/html/VMSpecTOC.doc.html (1999).*
Java™ Native Interface Specification, available at java.sun.com/j2se/1.4.2/docs/guide/jni/spec/jniTOC.html (2003).*

(Continued)

*Primary Examiner*—Meng-Al T. An
*Assistant Examiner*—Syed J Ali
(74) *Attorney, Agent, or Firm*—O'Melveny & Myers LLP

(57) ABSTRACT

A virtual machine system residing on a native machine comprises application code in a virtual machine specific format, native methods in a native machine specific format, and a plurality of execution entities that execute the application code and the native methods in parallel. An execution entity manager assigns a native method to an execution entity for execution. Based on an evaluation of the potential behavior of the native method, the execution entity manager assigns the native method to an execution entity optimized for the needs of the native method and the virtual machine system. This allows native methods that execute correctly in parallel to be assigned to an execution entity optimized to minimize system resources. Native methods that interfere with the parallel execution of other execution entities are assigned to an execution entity optimized to ensure correct native method operation.

19 Claims, 5 Drawing Sheets

OTHER PUBLICATIONS

AJ "The Jalapeno Virtual Mchine" By B. Alpern, C.R. Attanasio, J.J. Barton, M.G. Burke, P. Cheng, D.D. Choi, A. Cocchi, S.J. Fink, D. Grove, M. Hind, S.F. Hummel, D. Lieber, V. Litvinov, M.F. Mergen, T. Ngo, J.R. Russell, V. Sarkar, M.J. Serrano, J.C. Shepherd, S.E. Smith, V.C. Sreedhar, H. Srinivasan & J. Whaley IBM Systems Journal, vol. 39, No. 1, 2000; Alpern et al. pp. 211-238.

AK "The Portable Common Runtime Approach To Interoperability" By M. Weiser, A. Demers & C. Hauser, Xerox PARC 3333 Coyote Hill Road, Palo Alto, CA 94304 Email: weiser.pa@Xerox.com; file://C:WINDOWS/Temp/The%20Portable%20Common%20Runtirr . . . ; Sep. 25, 2002/ pp. 1-17.

* cited by examiner

Contents of Binding and Nonbinding Stubs

Nonbinding Stub 310

Stub Prologue
315

Binding Stub 330

Stub Prologue
335

Call to Native Method 320

Call to Native Method 340

Stub Epilogue
325

Stub Epilogue
345

Contents of Binding and Nonbinding Stubs

Nonbinding Stub 410

Stub Prologue
415

Call to Native Method 420

Stub Epilogue
425

Binding Stub 430

Stub Prologue
435

Call to Native Method 440

Stub Epilogue
445

Contents of Binding and Nonbinding Stubs

Nonbinding Stub 510

```
if this_thread.native_depth == 0
    then bind to native thread this_thread.native_depth :=
    this_thread.native_depth+1
```
518

Stub Prologue
515

Call to Native Method 520

```
this_thread.native_depth :=
    this_thread.native_depth-1 if this_thread.native_depth == 0
    then unbind from native thread
```
528

Stub Epilogue
525

Binding Stub 530

```
if this_thread.native_depth == 0
    then bind to native thread this_thread.native_depth :=
    this_thread.native_depth+1
this_thread.native_depth :=
    this_thread.native_depth |
0x40000000
```
548

Stub Prologue
535

Call to Native Method 540

```
this_thread.native_depth :=
    this_thread.native_depth-1 if this_thread.native_depth == 0
    then unbind from native thread
```
551

Stub Epilogue
545

Fig.5

HYBRID THREADS FOR MULTIPLEXING VIRTUAL MACHINE

FIELD OF THE INVENTION

The invention relates to the field of multitasking operating environments.

BACKGROUND OF THE INVENTION

As enterprises begin to integrate more of their data systems, complex server applications are used to provide access to the data systems. The server applications allow users to access, modify, and operate an enterprise's data systems. In order to be effective, the server applications must allow a large number of users to access the data systems at the same time. Large server applications must be able to handle thousands of users simultaneously and with minimal processing delay. To fulfill these requirements, large server applications demand enormous computing resources.

The processing requirements of large server applications may be satisfied by employing a distributed computing environment. A distributed computing environment is comprised of a group of networked computers working in concert to provide a variety of computing services. In this type of computing environment, software applications are separated into many application components. These components are distributed across the network of computers, so that different components may be executed by different computers within the distributed environment. The application components are designed to effectively operate in a distributed environment. The advantage of designing applications for a distributed computing platform include increased scalability to accommodate a large numbers of users, increased reliability, and efficient use of computing resources.

One example of a distributed computing environment is the .NET™ architecture developed by Microsoft™. The .NET™ architecture uses XML web services as small, discrete building-block applications connected to each other and other larger applications through a network or the Internet. XML web services may be distributed among one or more client or server computers. XML web services employ the extensible markup language (XML) for communication and may be written in a variety of programming languages, including the C# programming language developed by Microsoft Another example of a distributed computing environment is the Java™ 2 platform, Enterprise Edition (J2EE) architecture, which was developed by Sun Microsystems, Inc. J2EE applications are comprised primarily of Enterprise Java™ Beans (EJB), which are self-contained, reusable application components written in the Java™ programming language. The specification for the J2EE architecture is described in Java™ 2 Platform Enterprise Edition Specification, v1.3, available at Java.sun.com/j2ee/j2ee-1_3-pfd4-spec.pdf and incorporated by reference herein.

In the J2EE architecture, server applications are executed within an application server program installed on each computer in a distributed computing environment. Each server application may be spread over many application servers within the distributed computing environment, or concentrated within a single application server located on a single computer. Each computer may contain multiple processors to further distribute the workload of the application server program.

The J2EE application server program provides low-level functionality needed by server applications in a distributed programming environment. The functions provided by the J2EE application server program enable the application server to manage system resources, threads, memory, database connections, security, client connectivity, transaction management, and communications between users and applications.

The use of the Java™ programming language is one advantage of the J2EE architecture. The Java™ language provides a platform-independent execution environment, which enables complex applications to run effectively and efficiently on a variety of different types of computing devices. At the core of this platform independence is the Java™ virtual machine. The Java™ virtual machine provides the interface between the abstract Java™ environment and the native system. Although different native systems will require different Java™ virtual machines, each Java™ virtual machine will be able to run the same Java™ application.

The Java™ virtual machine is an abstract or "virtual" computer. Generally, the Java™ virtual machine is implemented as a software program executing on top of a native or "real" hardware and operating system, referred to as a native system. The Java™ virtual machine executes Java™ applications by translating the compiled Java™ code, referred to as bytecodes, into a format suitable for execution on the native system. The specification of the Java™ virtual machine is described in the Java™ Virtual Machine Specification, Second Edition, which is available at Java.sun.com/docs/books/vmspec/2nd-edition/html/VMSpecTOC.doc.html and is incorporated by reference herein.

A Java™ virtual machine may be implemented in a variety of ways. A simple Java™ virtual machine uses a Java™ interpreter. A Java™ interpreter translates a Java™ program as it is executed. A Java™ interpreter executes a Java™ program by retrieving a bytecode from an application, selecting a pre-existing native code sequence that performs the action of that bytecode for execution, and dispatching execution to the native code sequence. This process is repeated for each bytecode executed. If a portion of the Java™ application is executed repeatedly, for example in a program loop, then the selection and dispatch must be performed repeatedly for each bytecode executed.

The Java™ interpreter retrieves a bytecode from an application, translates the bytecode into native machine code, and then executes the native machine code. This process is repeated for each bytecode executed. If a portion of the Java™ application is executed repeatedly, for example in a program loop, the bytecodes must be re-translated each time they are executed. Thus, although this type of Java™ virtual machine is relatively simple to implement, it is slow and inefficient.

A faster and more efficient type of Java™ virtual machine uses a Java™ bytecode compiler, rather than a Java™ interpreter. With a Java™ bytecode compiler, groups of bytecodes are converted into native machine code. The application's machine code is then executed as a group. Once the bytecodes have been translated into native machine code, they may be executed many times without re-translation. This eliminates wasteful re-translation.

FIG. 1 shows an example of a Java™ virtual machine using a Java™ bytecode compiler. Java™ virtual machine 100 receives a Java™ application in the form of a group of Java™ bytecodes 105. The Java™ bytecodes 105 are then translated into application machine code by either the Ahead-of-Time (AOT) compiler 110 or the Just-In-Time (JIT) compiler 112. Application machine code can be executed by the native system without any further translation. AOT compiler 110 translates all of the bytecodes of the Java™ application 105 into application machine code prior to the start of execution of the application. Once the AOT compiler completes the translation, the application is executed as application machine code without any further translation. JIT compiler 112 translates portions of the application's bytecodes, typically corresponding to a single method of the application, as they are encountered for the first time. Once a portion of the application has been translated, it can be executed any number of times without additional translation.

Regardless of the type of compiler employed, the application bytecodes 105 are translated into application machine code 115 for execution. During execution, application machine code 115 will access memory from the pool of free memory, referred to as the heap 120. The heap 120 stores data objects associated with the execution of the application. A garbage collector searches the heap 120 for inactive data and reclaims that space.

Java™ threads 123 execute application machine code 115. Java™ threads 123 enable multitasking within the Java™ virtual machine 100 and are discussed in detail below. Each thread is a separate stream of execution of a portion of the application machine code 115.

In addition to the application machine code 115, many Java™ applications require the use of native methods. Native methods perform functions specific to the native system. System I/O functions, which are required by many Java™ applications, are examples of functions performed with native methods. Native methods may be incorporated directly into an application, or required as part of a library, a collection of ready-made software functions that is linked to the application. For example, the Java™ Native Interface (JNI) is a standard programming interface for writing native methods and embedding the Java™ virtual machine into native applications. JNI is described in the "Java™ Native Interface Specification," located JNI is described in the "Java™ Native Interface Specification," located at java.sun-.com/j2se/1.4.2/docs/guide/jni/spec/jniTOC.html and incorporated herein by reference.

Native methods may be written in many programming languages, for example C or C++, and are generally optimized for a specific native system. In order to be used by the Java™ virtual machine 100, libraries of native methods 117 are translated from their original programming language into native method machine code 119. This translation can be done with a compiler that is separate from the Java™ virtual machine 100.

When a native method is called by the application machine code, Java™-to-native transfer code 107 handles the transfer of execution between the application machine code 115 and the native method machine code 119. During execution of native method machine code 119, the application uses one or more native threads 133. Each native thread is a separate stream of execution with the native system. Similar to Java™ threads, native threads run in parallel, allowing multitasking in the native system. The native threads are managed by the native system. The Java™ virtual machine 100 includes interfaces allowing native method machine code 119 direct access to data stored in the virtual machine format. As it is executed by native threads 133, native method machine code 119 can access information and objects stored in heap 120 through native handle table 140. Native handle table 140 allows native method machine code to access heap 120 in coordination with the management of heap 120 by the Java™ virtual machine 100.

Many applications perform several different computing tasks in parallel using multitasking. Threading is a method that allows multitasking within a single application. Each thread is a separate stream of execution performing all or a portion of the application. Although Java™ threads and native threads have similar functions, each operates independently of the other. Java™ threads allow multiple execution streams of the application machine code, while native threads allow multiple execution streams of native methods and other native system functions.

Threads are executed concurrently, either by executing each thread on a different processor or by executing each thread for a short period of time on the same processor. Since the Java™ virtual machine is actually a software program executing on top of a native system, Java™ threads are actually executed within native threads running underneath the Java™ virtual machine. Java™ thread manager 125 determines how Java™ threads are distributed among one or more native threads. Common approaches for implementing Java™ threads include green threads, OS or native threads, and multiplexed threads.

Green threads are the simplest implementation of Java™ threads. In a green thread implementation, all of the Java™ threads run for a short period of time within a single native thread. Java™ thread manager 125 selects a Java™ thread to run in the native thread, sets a timer for a short interval, and starts the thread. When the timer expires, the Java™ thread manager stops the native thread and assigns another Java™ thread to the native thread. Despite its simplicity, the single threaded nature of a green threads implementation leads to several significant disadvantages. Since a green threads implementation only uses a single native thread, it does not take advantage of multiple processors and scales very poorly. Additionally, native methods are typically executed in the same native thread as the Java™ threads. If a native method blocks or does not return, which is common with native methods such as I/O functions, all of the Java™ threads halt execution as well, paralyzing the application.

Because of their simplicity, green threads were implemented in early versions of the Sun Java™ Development Kit (JDK), version 1.0. Green threads have been discontinued from the Microsoft Windows edition of the Sun JDK since version 1.2.0, but they remain available in many unsupported Unix editions. Additionally, the Python programming language can use a green thread implementation.

Unlike green threads, OS threads implement each Java™ thread as a separate, unshared, native thread. Since each Java™ thread is actually a native thread, the native system handles all of the management and scheduling associated with threads. Java™ thread management is delegated to the native thread management of the native system. By assigning each Java™ thread into a separate native thread, the OS threads implementation automatically take advantage of multiple processors when possible. Also, if a native method causes a native thread to block or not return, the other Java™ threads continue unimpeded.

Despite solving some of the problems associated with green threads, the OS thread implementation is slower and more inefficient. Many operating systems have technical features, such as address space restrictions, that limit the maximum number of native threads. Since each Java™ thread requires a separate native thread, this limits the maximum number of Java™ threads to the maximum number of native threads. Additionally, each native thread consumes a certain amount of native system resources as overhead. The overhead required by native threads is typically greater than that required by Java™ threads. Further, the extra overhead associated with native threads slows down transfers between Java™ threads. These factors increase the system requirements and decrease the efficiency of OS thread implementations in comparison with other Java™ thread implementations.

OS thread implementations are sometimes referred to as kernel threads or lightweight processes (LWP). OS threads are the default thread implementation for all Java™ systems released by Sun and IBM since version 1.1 of the JDK. OS thread implementations are also used by multithreaded C and C++ compilers, such as the Microsoft C and C++ compilers for Microsoft Windows.

A multiplexed thread implementation is a combination of the green thread and OS thread systems. Like a green threads system, a Java™ thread manager 125 coordinates the execution of Java™ threads. However, instead of using a single native thread, the Java™ thread manager 125 maintains a pool of a predetermined number of native threads. The number of native threads is selected to optimize performance on the native system. Java™ threads are multiplexed within the available native threads. If the number of Java™ threads is less than or equal to the number of available native threads, each Java™ thread is assigned to a separate native thread. If there are more Java™ threads than native threads, the Java™ thread manager selects Java™ threads to run for a short period of time within the available native threads. The use of multiple native threads takes advantage of multiple processors. Sharing each native thread between several Java™ threads avoids the limits on the number of native threads. Further, since thread transfers take place between Java™ threads, rather than native threads, performance is improved.

Multiplexed threads are also referred to as lightweight threads. The Unix operating system has a multiplexed threading implementation known as quickthreads. C, C++, and Python can also employ multiplexed threads.

Native method execution can present problems in multiplexed thread implementations. First, native methods may not return in a timely fashion. This can be due to a time-consuming operation, a thread blocking (being forced to wait on a resource), or the thread not returning at all. Although a delayed native method return does not paralyze the application as with green thread implementations, the pool of available threads is slowly depleted by this behavior. This can dramatically decrease the performance of the application.

Second, some native methods need to observe their thread state or thread identity to function properly. A native method that expects to be executed in the same thread on a subsequent call is an example of this. In a multiplexed thread implementation, a native method may be assigned to a different native thread each time it is called. This type of native method will not function properly in a multiplexed thread implementation.

Third, some native methods may modify a pre-existing thread state. As an example, a native method may incorrectly assume that it is the only method executing in a native thread and can reset the thread's I/O state. This will interfere with the pending I/O operations of other native methods which share this native thread.

Prior multiplexed thread implementations handled these problems with native methods in one of three ways. First, a thread manager can maintain a larger thread pool to allow for the loss of some native threads to blocking or non-returning native methods. Second, the thread manager can monitor the thread pool and add or subtract native threads as native methods change the number of available native threads. Third, the thread manager can allocate a second, separate, unshared pool of native threads for native method execution, and use the first pool of native threads for executing Java™ threads only.

Although each of these approaches solves the problem of blocking or non-returning native threads, these solutions do not scale well. Platform I/O, including network I/O, is typically implemented using native code. With large server applications, thousands of simultaneous connections may be required. It is very inefficient to allocate thousands of extra native threads to properly handle native methods. Additionally, none of these techniques address the problems caused by native methods that observe their thread state or identity, or that modify a pre-existing thread state.

Thus, it is desirable to have a threading implementation that efficiently handles native methods that: may block or fail to return in a timely fashion; may observe their OS identity or their thread state; or may modify the pre-existing thread state. It is further desirable to have a thread implementation that efficiently uses native system resources by minimizing the required number of native threads; improving the performance of thread-to-thread transfers; minimizing the overhead associated with each native thread; and taking maximum advantage of the multiprocessor capabilities of the native system.

SUMMARY OF THE INVENTION

The invention solves the drawbacks of prior threading implementations by distinguishing between native methods that function correctly within a multiplexed thread and native methods that require a separate unshared native thread. This allows native methods to operate correctly without consuming excessive native system resources:

In an embodiment, a virtual machine system residing on a native machine comprises application code in a virtual machine specific format, native methods in a native machine specific format, and a plurality of execution entities that operate portions of the application code and the native methods independently and in parallel. In an embodiment, an execution entity manager assigns a native method to an execution entity for execution. The execution entity manager evaluates the potential behavior of the native method. Based on this evaluation, the native method is assigned and executed on a different type of an execution entity optimized for the needs of the native method and the virtual machine system.

In another embodiment, if the native method can execute correctly in parallel with another execution entity without interfering with the execution entity and independent of the specific execution entity assigned by the execution entity manager, it can be assigned to an execution entity optimized to minimize system resources. If the native method interferes with the execution of another execution entity or depends on the specific execution entity assigned by the execution entity manager, it is assigned to an execution entity optimized to ensure correct native method operation.

In yet another embodiment, a first type of execution entity is released from executing the portion of the native method code following the completion of a single execution of the native method. Portions of the native method code assigned to a second type of execution entity are executed by the same execution entity each time the portion of the native method code is invoked. A further embodiment of the second type of execution entity also executes application code associated with the native method code following the completion of the first execution of the portion of the native method code.

In another embodiment, the execution entity manager assigns the native method to an execution entity using a native method transition code segment associated with the application code that invokes the portion of the native method code. An embodiment of the native method transition code segment is incorporated into a copy of the application code translated into the native machine system format. The application code may be translated with an interpreter or a compiler.

In another embodiment, the execution entity is created immediately prior to the first execution by the execution entity. A user specified parameter determines an attribute of the execution entity in a further embodiment. Alternatively, the execution entity is selected from a plurality of execution entities previously created and maintained by the execution entity manager.

Another embodiment of the virtual machine system allows for a native method that initiates an asynchronous I/O function to perform this function with an execution entity shared between several different processes. This embodiment realizes greater scalability in tasks such as implementing a synchronous I/O function in the application code as an asynchronous I/O function in the native method code.

SUMMARY OF THE FIGURES

The present invention will be described with reference to the drawings, in which:

FIG. 5 illustrates an example of different native method calling mechanisms according to an embodiment of the present invention.

The invention will be better understood with reference to the drawings and detailed description below. In the drawings, like reference numerals indicate like components.

DETAILED DESCRIPTION

The present invention introduces hybrid threading as a new type of threading implementation. In hybrid threading, threads are freely multiplexed within native threads until they call a native method. When a native method is first called, an evaluation of the native method behavior is used to determine the appropriate native method calling mechanism. If a native method observes its thread state or thread identity, or modifies the pre-existing thread state, a permanent binding calling mechanism is used. If a native method does not have any of these behaviors, then an unbound calling mechanism is used. The permanent binding calling mechanism efficiently handles native methods that: may block or fail to return in a timely fashion; may observe their OS identity or their thread state; or may modify the pre-existing thread state. The unbound calling mechanism utilizes multiplexing to minimize the use of native threads.

By assigning different calling mechanisms to native methods based on their behavior, hybrid threading efficiently handles threads with problematic behavior and minimizes the required number of native threads for non-problematic native methods. Using multiplexed native threads for as many native methods as possible allows hybrid threading to take maximum advantage of the multiprocessor capabilities of the native system and minimizes the overhead associated with thread-to-thread transfers. Permanent binding ensures problematic native methods are executed properly. Additionally, the use of a separate calling mechanism for some native methods allows the attributes of the native thread to be customized to the requirements of each native method. This minimizes the overhead associated with native threads.

Hybrid threading may be used for many types of programming languages and operating environments. In an embodiment of hybrid threading, Java™ threads are freely multiplexed within native threads until they call a native method. In an alternate embodiment, an application written in C, C++, C#, Python, or another programming language uses hybrid threading to multiplex lightweight threads within native threads until a specific type of native method is called. If a native method observes its thread state or thread identity, or modifies the pre-existing thread state, a permanent binding calling mechanism is used. If a native method does not have any of these behaviors, then an unbound calling mechanism is used.

Figure 1:
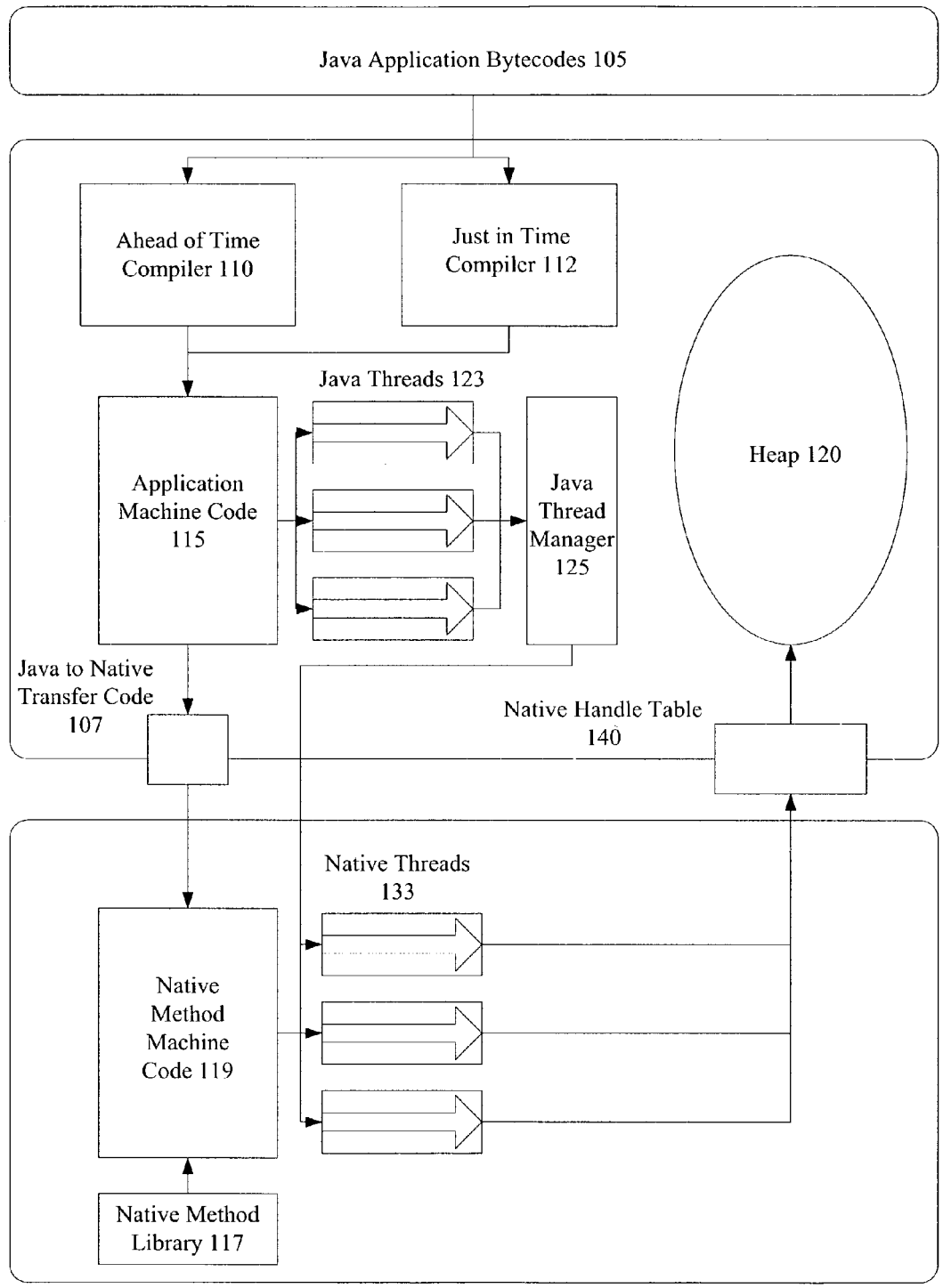
FIG. 1 illustrates a block diagram of an example Java™ virtual machine.
Figure 2:
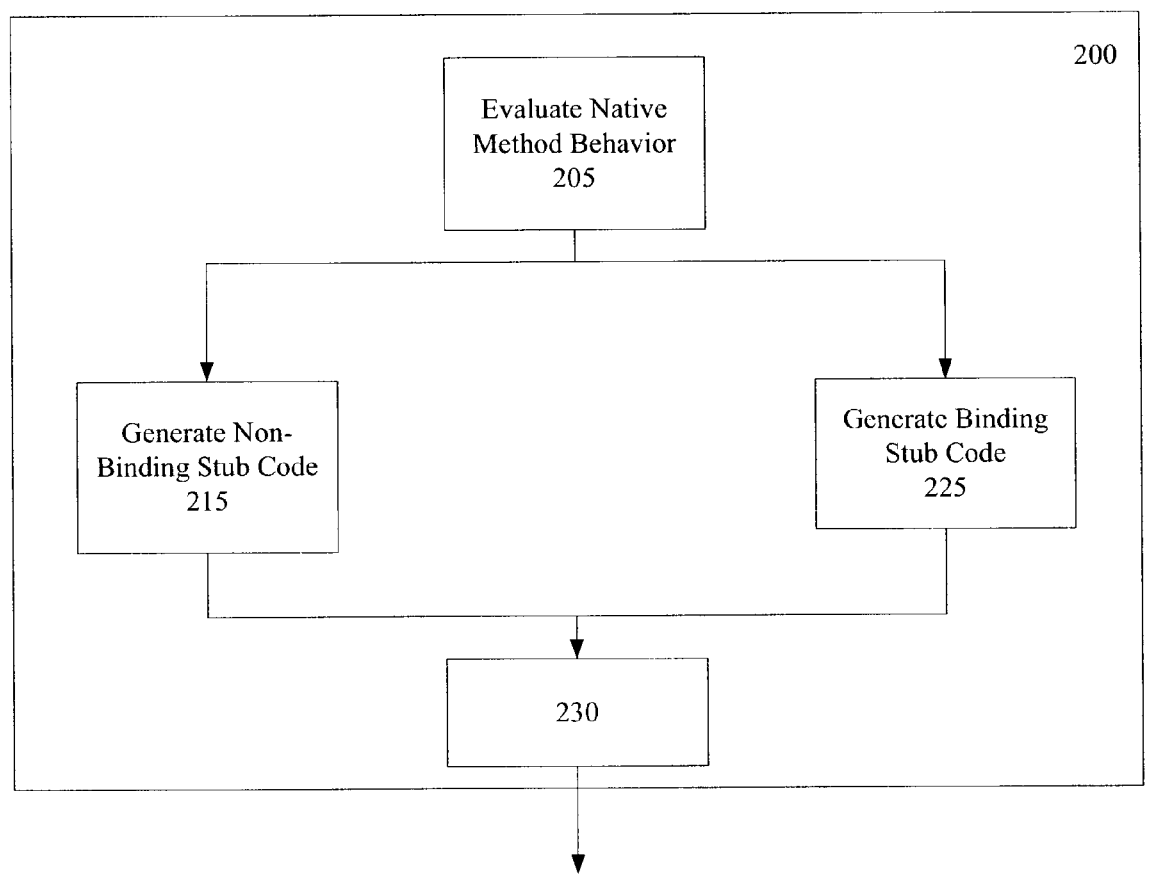
FIG. 2 illustrates a flowchart according to an embodiment of the present invention in which different native method calling mechanisms are used depending on the behavior of the native method.

FIG. 2 illustrates an embodiment of a method for using different native method calling mechanisms depending on the behavior of the native method. In this embodiment 200, different stubs are created for each type of native method. Stubs are special program segments that act as an interface between the application and the native method. The specific tasks performed by a stub are discussed in more detail below. Generally, a stub is associated with a specific native method call in an application and is executed immediately before and after the native method. In an embodiment, the JIT compiler 112 or AOT compiler 110 creates stubs during the translation between application bytecodes 105 and application machine code 115.

For each native method called by the application, the compiler evaluates the type of native method at step 205. Native methods are classified into types based on their potential for problematic behavior. In an embodiment, permanent native methods are native methods that can either observe thread state or identity, or modify a pre-existing thread state. Permanent native methods require the most resources for proper operation, and hence are the least scalable. Unbound native methods are native methods that do not depend on a particular native thread to execute properly. Unbound native methods require the least resources for proper operation and are the most scalable. In a further embodiment, native methods that are neither permanent or unbound are classified as temporary native methods. Temporary native methods offer a compromise between trouble-free execution and maximum scalability. Temporary native methods are more scaleable than permanent native methods, but may exhibit some problematic behavior with the most aggressive types of thread multiplexing.

The criteria for classifying native methods will vary depending on the details of the native system. In general, permanent native methods are native methods that either store thread specific information to be retrieved by a subsequent native method call or retrieve thread specific information stored by a previous native method call. In some embodiments, it may be desirable to have the smallest possible set of permanent native methods. Criteria used to narrow the number of permanent native methods include: whether the native method returns; whether the native method returns relatively quickly; whether the native method does not call back into the virtual machine, through, for example, a Java™ method; or the native method requires only a small, bounded amount of native thread stack for execution. In an embodiment, native method not meeting one or more criteria may alternately be classified as temporary native methods.

Examples of native methods classified as unbound include I/O calls used by the Java™ virtual machine itself, native methods that retrieve data from areas normally inaccessible to the Java™ virtual machine, and native methods that provide an interface to existing code written in other languages, such as floating point functions and compression libraries. Examples of native methods classified as permanent include native methods that manipulate event queues associated with threads, native methods that set flags in thread-local storage to check for per-thread initialization, and native methods that cancel pending I/Os issued by a particular thread.

In an embodiment, a compiler keyword or parameter facilitates the determination of native method type. The compiler keyword or parameter designates the native method type for a specific native method. This keyword or parameter is set by the application developer or system administrator. The compiler keywords or parameters can be placed in a separate configuration file or within the application source code. Application developers and system administrators can choose to designate (or not to designate) any native method using compiler keywords or parameters.

Compiler keywords and parameters may be used to designate a native method type for a particular instance of a native method call or for every call to a native method. In a further embodiment, native methods that are not designated by a keyword or parameter are automatically assigned to a default native method type, for example permanent or temporary. An additional embodiment allows the application developer or system administrator to specify additional parameters for a specific native method. These parameters optimize native system resources, such as stack size, associated with the native method. For example, an unbound native method call may use a parameter to specify a smaller stack size allocation. This permits the unbound native method call to execute with fewer native system resources.

In an alternate embodiment, an application can be "wrapped" in a test program to observe what native methods are called. This can be used to determine which native methods should be permanent. Additionally, certain programming techniques, such as the use of local thread storage or certain native libraries (e.g., USER32.DLL or GDI32.DLL in the Windows operating system) can indicate that a native method needs to be designated permanent.

Based on the native method type determined at step 205, the embodiment 200 creates an appropriate stub for the native method at step 215 or step 225. If the native method is permanent, step 225 generates a binding stub. If the native method is unbound, step 215 generates a non-binding stub. Step 215 generates non-binding stubs for temporary native methods as well. In an alternate embodiment, step 225 generates binding stubs for temporary native methods. If there are additional parameters to optimize native system resources associated with the native method, these are included in steps 215 and 225 as well.

Regardless of the type of stub generated, the resulting stub is incorporated into the application machine code 115 for execution in conjunction with the native method. Generally, when a permanent native method is called for the first time by a Java™ thread, it is assigned to a specific native thread.

Upon returning from the native method, the Java™ thread and any subsequent native methods will continue execution within this same native thread. The Java™ thread and native method remain permanently associated with the assigned native thread until the Java™ thread is terminated. At this point, the native thread is also terminated.

Assigning the Java™ thread to the same native thread used to execute the native method solves the problems caused by native methods that observe their thread state or identity, or that modify a pre-existing thread state. A Java™ thread may call the same native method several times in, for example, a loop or a recursive method. If the native method depends on the thread state or identity, then it must be executed in the same native thread each time it is invoked. By binding the Java™ thread to the same native thread used in the first invocation of the native method, the native method will be executed in this thread on each subsequent invocation.

In contrast, unbound native methods are by definition completely insensitive to the thread in which they execute. Each time an unbound native method is called, it can be assigned to any available native thread. The native thread assigned to an unbound native method can change even if the native method is called recursively. Additionally, a non-native method, for example a Java™ method, called from the unbound native method can be executed in a multiplexed thread. Upon returning from the unbound native method, the native thread is released for use by other Java™ threads or native methods. Execution of the calling Java™ thread continues in a multiplexed thread. Alternatively, an unbound native thread can be executed within the same native thread as the calling Java™ thread.

Temporary native methods are assigned to a separate native thread during the execution of the temporary native method and any other native methods called directly or transitively by the temporary native method. Upon completion of the temporary native method, execution of the calling Java™ thread resumes in a multiplexed thread. In a further embodiment, non-native method called by the temporary native methods are assigned to a multiplexed thread.

The following example illustrates the differences between permanent, temporary, and unbound native methods executed by an embodiment of a hybrid thread implementation. Initially, a Java™ thread calls a native method. In this example, the native method calls a Java™ method. The Java™ method makes a second call to the same native method. Upon the second call to the native method, this instance of the native method completes and returns back to the Java™ method. The Java™ method then completes and returns to the first call of the native method. The first call of the native method completes and returns to the calling Java™ thread.

If the native method is a permanent native method, then a native thread is assigned to execute the first call of the native method. This native thread will execute the first call of the native method, the Java™ method called by the native method, and the second call of the native method. Upon returning from all of the method calls, the Java™ thread and any subsequent method calls will also be executed by the same native thread.

A temporary native method also assigns a native thread to execute the first call of a native method. The native thread will execute the first call of the native method, the Java™ method, and the second call of the native method. Upon completion of the first call to the native method, the native thread is released and the calling Java™ thread returns to execution within a multiplexed thread. Subsequent calls to the native method by the Java™ thread can be assigned to a different native thread.

An unbound native method assigns a native thread to execute the first call of a native method. The Java™ method called by the native method will be executed by a multiplexed thread. When the Java™ method makes the second call to the native method, a different native thread is assigned to execute this instance of the native method. Upon completion of the first call to the native method, the native thread is released and the calling Java™ thread returns to execution within a multiplexed thread. Subsequent calls to the native method by the Java™ thread can be assigned to different native threads.

Unbound native methods are highly scalable in some situations, but are generally more complicated to implement. In an embodiment, application activation stacks, which keep track of native method invocations, are managed as a list of stack segments that are not relocated. The unbound native method is then executed in the same thread as the calling application. The stub associated unbound native method ensures that the current stack segment is large enough to execute the unbound native method.

In an alternate embodiment, the stub associated with the unbound native method allocates a stack just large enough for the execution of the native method. Nested unbound native method calls use different stack segments. No threads are necessarily bound to the unbound native method execution. The unbound native methods can execute within an application thread.

Figure 3:
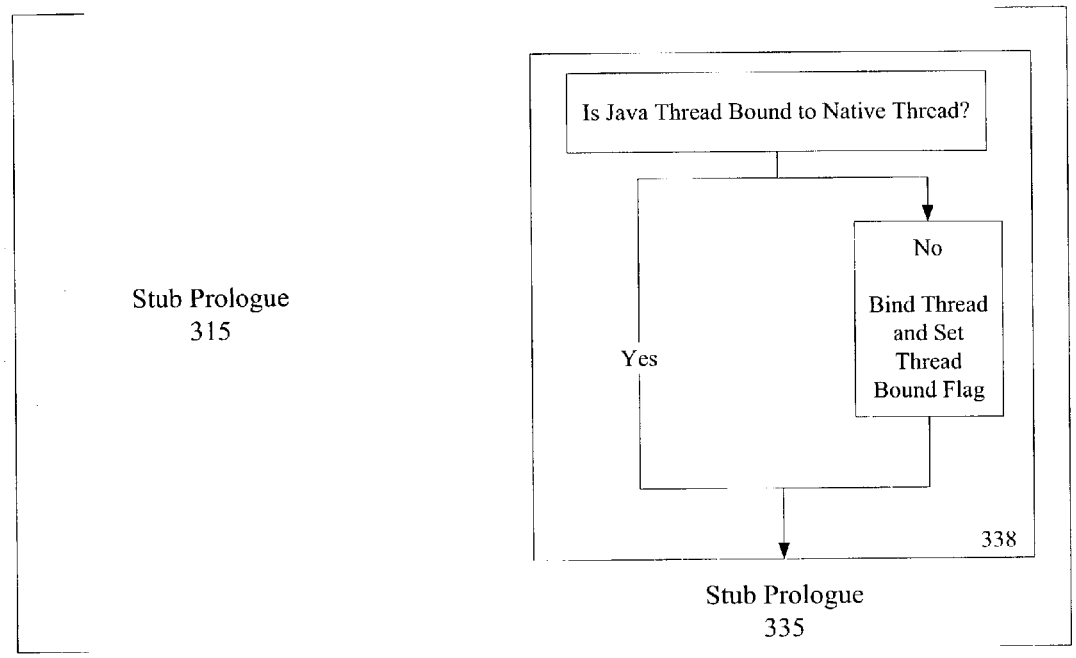
FIG. 3 illustrates an example of different native method calling mechanisms according to an embodiment of the present invention.
Figure 3:

FIG. 3 illustrates an example of different native method calling mechanisms according to an embodiment of the present invention. Non-binding stub 310 comprises stub prologue 315, native method call 320, and stub epilogue 325. Stub prologue 315 performs the steps necessary to initialize the native method and transfer execution from the calling Java™ thread to the native method. The steps taken by the stub prologue depend on the specific implementation of the virtual machine, and in particular, the threading model, the details of the threading implementation, the garbage collector, the exception handler, type checking and debugging options, and tuning options.

An example of the steps taken by stub prologue 315 illustrate the operation of the stub prologue. First, there is a Java™-compatible entry sequence for receiving calling parameters from the Java™ thread and committing to the native method execution. A JNI-specific linkage can be required for security, checking and debugging, and exception handling. If the native method is a synchronized method, synchronization should also be established in the stub prologue. Local native handles, which enable access to objects in the heap 120 by the native method, are allocated and any pointer parameters are converted into handles. If multiple JNI dialects are supported, the JNI dialect is pushed onto the stack.

A native thread is then bound to the native method. A new native thread can be retrieved from the native system for this purpose. Alternatively, the current native thread used by the calling Java™ thread can be used for native method execution. In a further embodiment, a native thread may be selected from a pool of available native threads maintained by the virtual machine. The selected native thread is initialized by transferring to the native thread stack and the native thread is detached from the garbage collector. Finally, the parameters for the native method are arranged as required by the native method.

Once execution of the stub prologue 315 is complete, the native method begins execution with the actual call to the native method at step 320. Upon completion of the native method, stub epilogue 325 is executed to release resources used by the native method and transfer control back to the calling Java™ thread. Generally, the stub epilogue reverses steps of the stub prologue 325.

Binding stub 330 comprises stub prologue 335, native method call 340, and stub epilogue 345. The operation of binding stub 330 is generally analogous to the operation of non-binding stub 310 discussed above, except for the addition of stub binding step 338 to the stub prologue 335.

Stub binding step 338 determines if the calling Java™ thread is bound to a native thread. This determination can be done in an embodiment by examination of the value of a thread binding flag. If the Java™ thread has previously called a permanent native method, then the Java™ thread will still be bound to the same native thread. In this situation, step 338 is complete and the execution of the stub prologue 335 continues as discussed above. But, if the Java™ thread is not bound to a native thread, then step 338 permanently binds the Java™ thread to a selected native thread. The calling Java™ thread will continue to execute in the selected native thread after execution of the native method. In an embodiment, step 338 also sets a thread bound flag in the Java™ thread, which will indicate in subsequent native method calls that the Java™ thread is already permanently bound. Stub prologue then continues as explained above.

Figure 4:
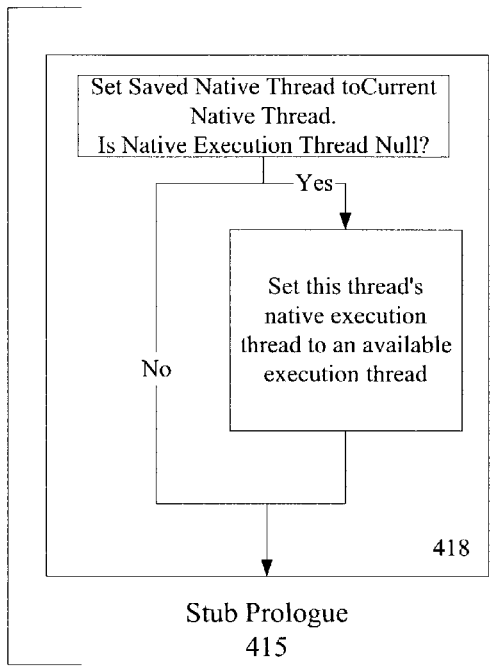
FIG. 4 illustrates an example of different native method calling mechanisms according to an embodiment of the present invention.
Figure 4:
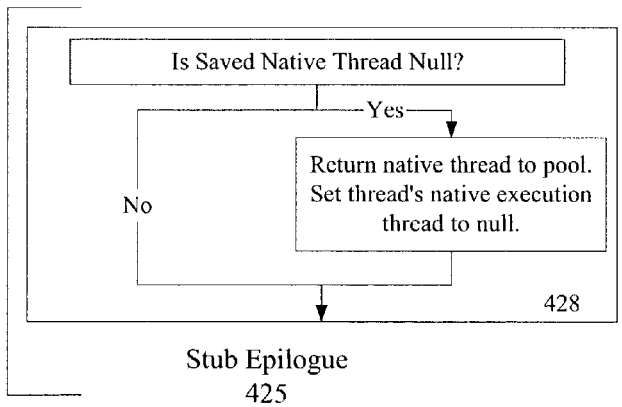
Figure 4:
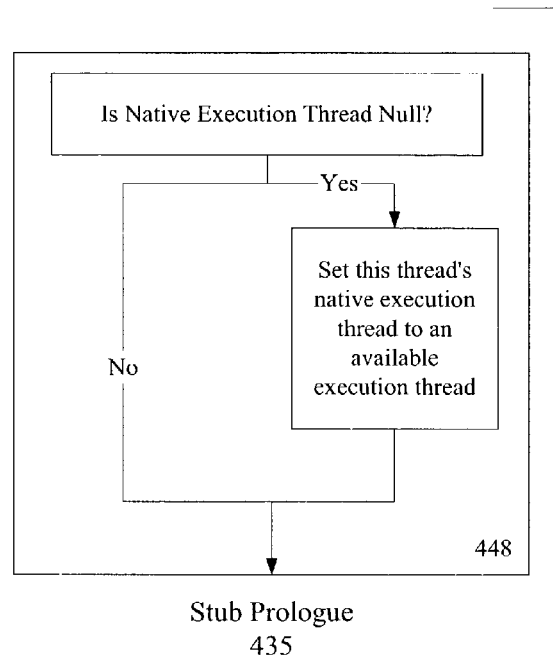
Figure 4:
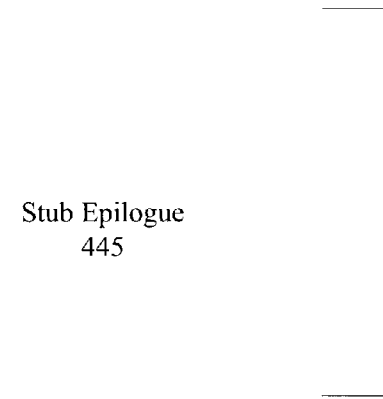

FIG. 4 illustrates an example of different native method calling mechanisms according to an embodiment of the present invention. Non-binding stub 410 comprises stub prologue 415, native method call 420, and stub epilogue 425. The operation of non-binding stub 410 is generally analogous to the operation of non-binding stub 310 discussed above, except for the addition of stub binding step 418 to the stub prologue 415 and stub unbinding step 428 to stub epilogue 425.

Stub binding step 418 stores the identity of the native thread bound to the calling Java™ thread to a saved native thread variable. If the Java™ thread is unbound, then this variable is set to null. A non-null value indicates that the calling Java™ thread is bound to a native thread. This can be the result of a previous call to a permanent native method by the Java™ thread. In this situation, even though the current native method is unbound and does not require a permanent native thread binding, the native thread binding must be preserved for correct operation of a permanent native method also called by the Java™ thread. After the Java™ thread's native thread binding has been preserved, a native thread is selected to execute the current native method. If the Java™ thread is unbound, indicated by a null native thread value, then the next available native thread is selected. If the Java™ thread has been previously bound to a native thread, then this thread is used for execution of the unbinding native method as well. This minimizes the number of native threads required for execution. Stub prologue 415 then continues as discussed above.

Following the completion of the unbound native thread, stub epilogue 425 reverses the steps of stub prologue 415. Stub unbinding 428 step evaluates the saved native thread variable. If this variable is null, then the native thread previously selected to execute the native method is released, either to the native system or to a native thread pool maintained by the Java™ virtual machine. Once unbound from the native thread, the calling Java™ thread returns to multiplexed execution as discussed above. If the saved native thread indicates that the Java™ thread should be permanently bound to the current native thread, then step 428 does nothing and execution continues within the native thread.

Binding stub 430 comprises stub prologue 435, native method call 440, and stub epilogue 445. The operation of binding stub 430 is generally analogous to the operation of non-binding stub 410 discussed above, except for the omission of stub unbinding step 428 from the stub epilogue 445. Since Java™ thread execution following a permanent native method must be within the same native thread, the thread unbinding step is unneeded.

FIG. 5 illustrates an example of different native method calling mechanisms according to an embodiment of the present invention. Non-binding stub 510 comprises stub prologue 515, native method call 520, and stub epilogue 525. The operation of non-binding stub 510 is generally analogous to the operation of non-binding stub 310 discussed above, except for the addition of stub binding step 518 to the stub prologue 515 and stub unbinding step 528 to stub epilogue 525. Similarly, binding stub 530 comprises stub prologue 535, native method call 540, and stub epilogue 545. The operation of binding stub 530 is generally analogous to the operation of non-binding stub 330 discussed above, except for the addition of stub binding step 548 to the stub prologue 535 and stub unbinding step 551 to stub epilogue 545.

Stubs 510 and 530 are embodiments adapted to handle native methods that call other native or Java™ methods prior to returning. Native methods that call other methods result in layers of method calls assigned to the native thread. Each method called can return to the previously called method. When a called method returns, the information associated with the method, often stored on a stack, needs to be cleaned up. This can be done incrementally as each layer of method calls returns.

However, some methods terminate the thread rather than returning to the calling method. Since the thread termination will prevent the called methods from returning, the information remaining from each of the previously called methods cannot be cleaned up incrementally. The thread.native_depth is used in this situation. The thread.native_depth variable keeps track of the number of layers of calls executed by the native thread. Upon thread termination, the thread manager uses this variable to trace back through the information stored for each called method and perform any necessary clean up.

Stub binding step 518 determines whether the calling thread is already bound to a native thread from the value of the thread.native_depth variable. If the thread.native_depth is 0, then the calling thread is unbound and the native method is bound to a new native thread. Otherwise, the native thread is executed by the same native thread as the calling thread. Regardless of the thread binding, the thread-.native_depth variable is incremented. This indicates the number of layers of method calls executed by the thread and that the native thread is bound for future native method calls. Stub unbinding step 528 reverses the function of stub binding step 518. If the thread.native_depth is 0, then the native thread is released.

Stub binding step 548 is similar to stub binding step 518, with the exception of the addition of an OR operation to set the highest positive-valued bit of the thread.native_depth variable to 1. This operation servers two purposes: first, it simplifies the test for a bound (temporary or permanent) thread into a simple comparison with zero and permits the use of common code for both types of thread; and second, this indicates to the thread manager whether information from previously called methods needs to be cleaned up. In particular, if the thread.native_depth is 0 except for the highest bits, then the native thread is clean and there is no clean up necessary. Stub unbinding step 551 reverses the function of stub binding step 548. If the thread.native_depth is 0, then the native thread is released.

Hybrid threads are applicable to a variety of different types of native methods. In an embodiment, hybrid threads may be used to greatly improve the scalability of I/O operations. I/O operations are typically communications between the native systems and devices such as disks, keyboards, and network interfaces. At the lowest level in a native system, I/O operations are typically asynchronous. The native system dispatches an instruction to the I/O device, and then moves on to perform other tasks. When the I/O operation is complete, the I/O device interrupts the native system. The native system then processes the result of the I/O operation.

In contrast low level native system I/O, many high-level programming languages only have synchronous I/O operations. For example, prior to version 1.4 of the Java™ language, asynchronous I/O was unavailable. Although synchronous I/O is easier to program, synchronous I/O typically scales very poorly. In a synchronous I/O call, the calling thread will block, or stop and wait, for the result of an I/O operation. The thread will not perform any other tasks while waiting for the I/O result. If high-level synchronous I/O operations are implemented directly by the native system, then the corresponding native thread will also block. This wastes valuable native system resources.

To improve the scalability of synchronous I/O operations, many prior thread implementations translate high-level synchronous I/O calls into low-level asynchronous native I/O calls. For example, a threading implementation can translate a synchronous Java™ I/O call to one or more asynchronous I/O native methods. During execution of the asynchronous I/O calls, the threading implementation suspends the calling Java™ thread and is free to execute other tasks. When the results of the asynchronous I/O operation are received, the threading implementation matches these results to the appropriate calling Java™ thread and restarts the thread. From the perspective of the calling Java™ thread, the I/O operation appears to be synchronous. However, the low-level asynchronous I/O operation allows the native system to perform other tasks while waiting for the results of the I/O operation.

This translation from high-level synchronous I/O operations to low-level asynchronous I/O operations requires some additional overhead by the threading implementation. Before making the low-level asynchronous I/O call, the threading implementation must make a notation of the calling Java™ thread. This enables the I/O results to be matched to the correct calling thread upon completion of the asynchronous I/O operation. This notation is a thread local information and normally requires a permanent native thread binding to execute properly. In large server applications with several thousand simultaneous network connections, this permanent binding requirement consumes a prohibitively large number of native threads.

In an embodiment of the hybrid threads, high-level synchronous I/O operations are translated into low-level asynchronous I/O operations. However, rather than permanently binding each asynchronous I/O operation to a native thread, this embodiment classifies the asynchronous I/O operations as temporary native methods and uses a temporary native thread binding as discussed above. Alternatively, the native methods may be classified as unbound native methods. In a further embodiment, if high-level asynchronous I/O functions are also available, for example in Java™ 1.4 or later, the native methods associated with the high-level asynchronous I/O functions are implemented as temporary or unbound native methods. These embodiments allow the assigned native threads to be released from the asynchronous I/O operations much sooner than with permanent bindings. Once released, the native threads can be reassigned to other tasks. The net result is a decrease in the required number of native threads and an increase in the scalability of server applications.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. For example, the invention is not limited to the threading paradigm for multitasking systems. The invention may be implemented on any type of multitasking system that assigns separate processing tasks to abstract processing entities for execution.

The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A virtual machine system residing on a native machine, the virtual machine system comprising:
    application code in a virtual machine specific format;
    native method code in a native machine specific format;
    a plurality of execution entities that operate portions of the application code and the native method code independently and in parallel; and
    an execution entity manager that assigns a portion of the native method code to an execution entity for execution;
    wherein the execution entity manager evaluates the potential behavior of the portion of the native method code, creates an execution entity of a first type and immediately assigns the execution entity of the first type to the portion of the native method code if the portion of the native method code has a first type of behavior, and creates an execution entity of the second type and immediately assigns the execution entity of the second type to the portion of the native method code if the portion of the native method code has a second type of behavior;
    wherein the second behavior type indicates that the execution of the portion of the native method interferes with the execution of another execution entity or depends on the specific execution entity assigned by the execution entity manager;
    wherein the second type of behavior includes the portion of the native method code failing to complete execution in a predetermined amount of time.

2. A virtual machine system residing on a native machine, the virtual machine system comprising:
    application code in a virtual machine specific format;
    native method code in a native machine specific format;
    a plurality of execution entities that operate portions of the application code and the native method code independently and in parallel; and
    an execution entity manager that assigns a portion of the native method code to an execution entity for execution;
    wherein the execution entity manager evaluates the potential behavior of the portion of the native method code, creates an execution entity of a first type and immediately assigns the execution entity of the first type to the portion of the native method code if the portion of the native method code has a first type of behavior, and creates an execution entity of the second type and immediately assigns the execution entity of the second type to the portion of the native method code if the portion of the native method code has a second type of behavior;
    wherein the second behavior type indicates that the execution of the portion of the native method interferes with the execution of another execution entity or depends on the specific execution entity assigned by the execution entity manager;
    wherein the second type of behavior includes the portion of the native method code examining an attribute of the execution entity.

3. A virtual machine system residing on a native machine, the virtual machine system comprising:
    application code in a virtual machine specific format
    native method code in a native machine specific format;
    a plurality of execution entities that operate portions of the application code and the native method code independently and in parallel; and
    an execution entity manager that assigns a portion of the native method code to an execution entity for execution;
    wherein the execution entity manager evaluates the potential behavior of the portion of the native method code, creates an execution entity of a first type and immediately assigns the execution entity of the first type to the portion of the native method code if the portion of the native method code has a first type of behavior, and creates an execution entity of the second type and immediately assigns the execution entity of the second type to the portion of the native method code if the portion of the native method code has a second type of behavior;
    wherein the second behavior type indicates that the execution of the portion of the native method interferes with the execution of another execution entity or depends on the specific execution entity assigned by the execution entity manager;
    wherein the second type of behavior includes the portion of the native method code modifying an attribute of the execution entity.

4. A virtual machine system residing on a native machine, the virtual machine system comprising:
    application code in a virtual machine specific format;
    native method code in a native machine specific format;
    a plurality of execution entities that operate portions of the application code and the native method code independently and in parallel; and
    an execution entity manager that assigns a portion of the native method code to an execution entity for execution;
    wherein the execution entity manager evaluates the potential behavior of the portion of the native method code, creates an execution entity of a first type and immediately assigns the execution entity of the first type to the portion of the native method code if the portion of the native method code has a first type of behavior, and creates an execution entity of the second type and immediately assigns the execution entity of the second type to the portion of the native method code if the portion of the native method code has a second type of behavior;

wherein at least a portion of the plurality of execution entities is a group of native threads managed by the native machine;

wherein at least a portion of the plurality of execution entities is a group of virtual machine threads managed by a virtual machine thread manager independently of the native machine.

5. The virtual machine system of claim 4, wherein a portion of a copy of the application code translated into the native machine system format is executed within the group of virtual machine threads.

6. The virtual machine system of claim 5, wherein the virtual machine thread manager assigns one or more virtual machine threads to each native thread for execution by the native machine.

7. The virtual machine of claim 6, wherein:

the execution entity of the first type invokes the portion of the application code for execution;

the portion of the application code is assigned by the virtual machine thread manager to be executed by a virtual machine thread; and the execution entity of the first type is released from executing the portion of the native method code following the completion of a single execution of the portion of the native method code.

8. The virtual machine system of claim 6, wherein a native thread executes a first virtual machine thread during a first time interval and a second virtual machine thread during the second time interval.

9. A virtual machine system residing on a native machine, the virtual machine system comprising:

application code in a virtual machine specific format;

native method code in a native machine specific format;

a plurality of execution entities that operate portions of the application code and the native method code independently and in parallel; and an execution entity manager that assigns a portion of the native method code to an execution entity for execution;

wherein the execution entity manager evaluates the potential behavior of the portion of the native method code, creates an execution entity of a first type and immediately assigns the execution entity of the first type to the portion of the native method code if the portion of the native method code has a first type of behavior, and creates an execution entity of the second type and immediately assigns the execution entity of the second type to the portion of the native method code if the portion of the native method code has a second type of behavior;

wherein a portion of the application code is associated with a synchronous I/O function of the virtual machine system;

the portion of the native method code is an asynchronous I/O function of the native machine associated with the synchronous I/O function; and the execution entity manager assigns an execution entity of the first or second type to the portion of the native method code in response to the execution of the portion of the application code;

wherein the execution entity manager suspends the execution of the portion of the application code prior to the execution of the portion of the native method code; and the execution entity manager restarts the execution of the portion of the application code following the completion of the execution of the portion of the native method code.

10. The virtual machine system of claim 9 wherein:

the execution entity manager receives a result from the native system in response to the execution of the portion of the native method code;

the execution entity manager matches the result to the synchronous I/O function associated with the portion of the native method code; and the execution entity manager restarts the execution of the portion of the application code following the matching of the result.

11. The virtual machine system of claim 10, wherein the execution entity manager matches the result using information associated with a specific execution entity.

12. A virtual machine system residing on a native machine, the virtual machine system comprising:

application code in a virtual machine specific format;

native method code in a native machine specific format;

a plurality of execution entities that operate portions of the application code and the native method code independently and in parallel; and an execution entity manager that assigns a portion of the native method code to an execution entity for execution;

wherein the execution entity manager evaluates the potential behavior of the portion of the native method code, creates an execution entity of a first type and immediately assigns the execution entity of the first type to the portion of the native method code if the portion of the native method code has a first type of behavior, and creates an execution entity of the second type and immediately assigns the execution entity of the second type to the portion of the native method code if the portion of the native method code has a second type of behavior;

wherein a portion of the application code is associated with a synchronous I/O function of the virtual machine system;

the portion of the native method code is an asynchronous I/O function of the native machine associated with the synchronous I/O function; and the execution entity manager assigns an execution entity of the first or second type to the portion of the native method code in response to the execution of the portion of the application code;

wherein the execution entity executes a second portion of the native method code until the completion of a single execution of the first portion of the native method code.

13. A virtual machine system residing on a native machine, the virtual machine system comprising:

application code in a virtual machine specific format;

native method code in a native machine specific format;

a plurality of execution entities that operate portions of the application code and the native method code independently and in parallel; and an execution entity manager that assigns a portion of the native method code to an execution entity for execution;

wherein the execution entity manager evaluates the potential behavior of the portion of the native method code, creates an execution entity of a first type and immediately assigns the execution entity of the first type to the portion of the native method code if the portion of the native method code has a first type of behavior, and creates an execution entity of the second type and immediately assigns the execution entity of the second type to the portion of the native method code if the portion of the native method code has a second type of behavior;

wherein a portion of the application code is associated with a synchronous I/O function of the virtual machine system;

the portion of the native method code is an asynchronous I/O function of the native machine associated with the synchronous I/O function; and the execution entity manager assigns an execution entity of the first or second type to the portion of the native method code in response to the execution of the portion of the application code;

wherein the execution entity executes a second portion of the application code until the completion of a single execution of the first portion of the native method code.

14. A method for executing a native method on a multi-tasking native system comprised of a plurality of execution entities, the method comprising:

evaluating the potential behavior of a first native method based on a predefined indicator associated with the first native method and set by a user;

assigning the first native method to an execution entity based on the evaluation;

executing the first native method with the execution entity;

suspending execution of the application code segment prior to the execution of the first native method; and restarting execution of the application code segment following the completion of the execution of the first native method;

wherein an application code segment is associated with an I/O function;

the first native method is associated with an asynchronous I/O function; and the first native method is assigned to an execution entity in response to the execution of the application code segment.

15. The method of claim 14, further comprising:

receiving a result in response to the completed execution of the first native method;

matching the result to the application code segment; and restarting execution of the application code segment following the matching of the result.

16. The method of claim 15, wherein the matching step uses information associated with a specific execution entity.

17. A computer readable storage medium including an arrangement of computer-readable instructions that direct a computer to perform the method comprising of the steps:

evaluating the potential behavior of a first native method based on a predefined indicator associated with the first native method and set by a user;

assigning the first native method to an execution entity based on the evaluation;

executing the first native method with the execution entity;

suspending execution of the application code segment prior to the execution of the first native method; and restarting execution of the application code segment following the completion of the execution of the first native method;

wherein an application code segment is associated with an I/O function;

the first native method is associated an asynchronous I/O function; and the first native method is assigned to an execution entity in response to the execution of the application code segment.

18. The computer readable storage medium of claim 17, further comprising:

receiving a result in response to the completed execution of the first native method;

matching the result to the application code segment; and restarting execution of the application code segment following the matching of the result.

19. The computer readable storage medium of claim 18, wherein the matching uses information associated with a specific execution entity.

* * * * *